United States Patent
Wang

(10) Patent No.: US 10,909,683 B2
(45) Date of Patent: Feb. 2, 2021

(54) METHODS AND SYSTEMS FOR ENHANCING OPTICAL IMAGE QUALITY

(71) Applicant: Ruikang K. Wang, Seattle, WA (US)

(72) Inventor: Ruikang K. Wang, Seattle, WA (US)

(73) Assignee: Ruikang K. Wang, Bellevue, WA (US)

(*) Notice: Subject to any disclaimer, the term of this patent is extended or adjusted under 35 U.S.C. 154(b) by 53 days.

(21) Appl. No.: 16/332,524

(22) PCT Filed: Sep. 22, 2017

(86) PCT No.: PCT/US2017/052869
§ 371 (c)(1),
(2) Date: Mar. 12, 2019

(87) PCT Pub. No.: WO2018/057838
PCT Pub. Date: Mar. 29, 2018

(65) Prior Publication Data
US 2019/0213738 A1    Jul. 11, 2019

Related U.S. Application Data

(60) Provisional application No. 62/398,163, filed on Sep. 22, 2016.

(51) Int. Cl.
G06T 7/00 (2017.01)
G06T 5/00 (2006.01)
G06T 5/50 (2006.01)

(52) U.S. Cl.
CPC ............ G06T 7/0016 (2013.01); G06T 5/002 (2013.01); G06T 5/50 (2013.01); G06T 2207/10101 (2013.01); G06T 2207/20182 (2013.01); G06T 2207/30104 (2013.01)

(58) Field of Classification Search
CPC ......... G06T 7/0016; G06T 5/002; G06T 5/50; G06T 2207/10101; G06T 2207/20182; G06T 2207/30104
See application file for complete search history.

(56) References Cited

U.S. PATENT DOCUMENTS

2009/0263001 A1   10/2009   Ding et al.
2014/0316286 A1*  10/2014   Addison ............. A61B 6/504
                                              600/484

FOREIGN PATENT DOCUMENTS

WO    WO 2014/168930    * 10/2014    ............. A61B 5/00

OTHER PUBLICATIONS

The International Search Report (ISR) with Written Opinion for PCT/US2017/052869 dated Dec. 1, 2017, pp. 1-17.
(Continued)

*Primary Examiner* — David F Dunphy

(57) ABSTRACT

Systems and methods for enhancing quality of a flow image of a sample are provided. An image is obtained from a plurality of optical image scans of a sample comprising blood perfused tissue. A vector comprising tissue components, flow components, and noise is then generated, and eigenvectors and eigenvalues are estimated from the vector. From the eigenvectors and eigenvalues, an eigen regression filter is applied to isolate flow components from the tissue components in the sample. The isolated tissue components may then be removed from the image to enhance visualization and quantification of a flow of dynamic moving particles within the sample.

18 Claims, 11 Drawing Sheets

(56) References Cited

OTHER PUBLICATIONS

Yousefi, Siavash et al. "Eigendecompositio11-Based Clutter Filtering Technique for Optical Microangiography" IEEE Transactions on Biomedical Engineering (2011) Fol. 58(8), pp. 2316-2323.

Yousefi, Siavash et al. "Super-resolution spectral estimation of optical micro-angiography for quantifying blood flow within microcirculatory tissue beds in vivo" Biomedical Optics Express (2013) vol. 4(7), p. 1214.

Kasai, Chihiro et al. "Real-Time Two-Dimensional Blood Flow Imaging Using an Autocorrelation Technique" IEEE Transactions on Sonics and Ultrasonics (1985) vol. 32(3), pp. 458-464.

Zhang, Anqi et al. "Methods and algorithms for optical coherence tomography-based angiography: a review and comparison" Journal of Biomedical Optics (2015) vol. 20(10), p. 100901.

Zhang, Qinqin et al. "Highly efficient eigen decomposition based statistical optical microangiography" Quantitative Imaging in Medicine and Surgery (2016) vol. 6(5), pp. 557-563.

\* cited by examiner

| Pump rate (µL/hr) | Flow rate (µL/hr) | | | | Average velocity (mm/s) | | | |
|---|---|---|---|---|---|---|---|---|
| | D1 | D2 | D3 | D4 | D1 | D2 | D3 | D4 |
| 3.46 | 1.76 | 0.88 | 0.44 | 0.22 | 0.1 | 0.1 | 0.1 | 0.1 |
| 10.37 | 5.20 | 2.60 | 1.30 | 0.65 | 0.3 | 0.3 | 0.3 | 0.3 |
| 17.28 | 8.64 | 4.32 | 2.16 | 1.08 | 0.5 | 0.5 | 0.5 | 0.5 |
| 27.65 | 13.84 | 6.92 | 3.46 | 1.73 | 0.8 | 0.8 | 0.8 | 0.8 |
| 41.47 | 20.72 | 10.36 | 5.18 | 2.59 | 1.2 | 1.2 | 1.2 | 1.2 |
| 51.84 | 25.92 | 12.96 | 6.48 | 3.24 | 1.5 | 1.5 | 1.5 | 1.5 |
| 62.21 | 31.12 | 15.56 | 7.78 | 3.89 | 1.8 | 1.8 | 1.8 | 1.8 |
| 69.12 | 34.56 | 17.28 | 8.64 | 4.32 | 2.0 | 2.0 | 2.0 | 2.0 |
| 103.68 | 51.84 | 25.92 | 12.96 | 6.48 | 3.0 | 3.0 | 3.0 | 3.0 |
| 138.24 | 69.12 | 34.56 | 17.28 | 8.64 | 4.0 | 4.0 | 4.0 | 4.0 |
| 172.8 | 86.40 | 43.20 | 21.60 | 10.80 | 5.0 | 5.0 | 5.0 | 5.0 |

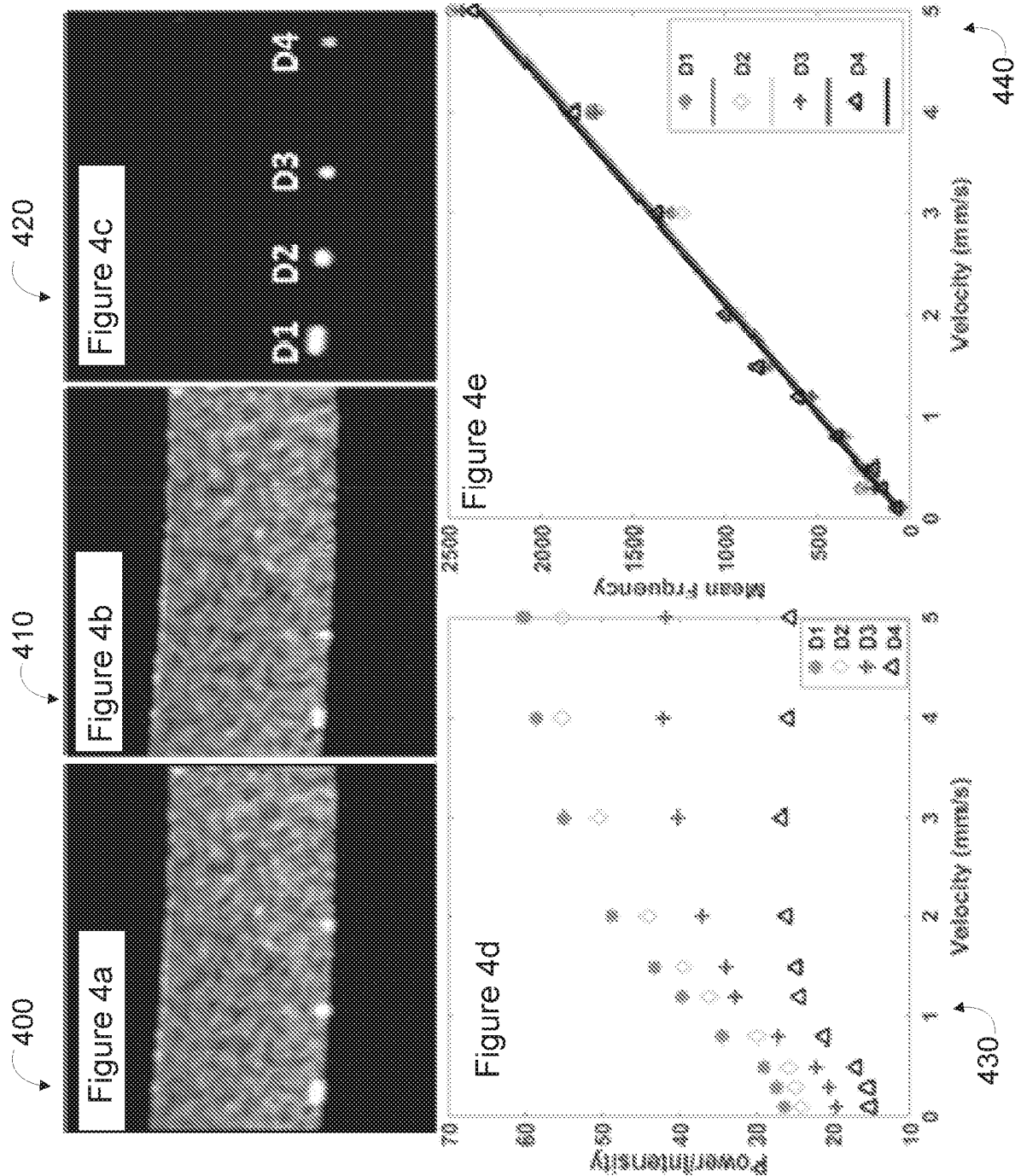

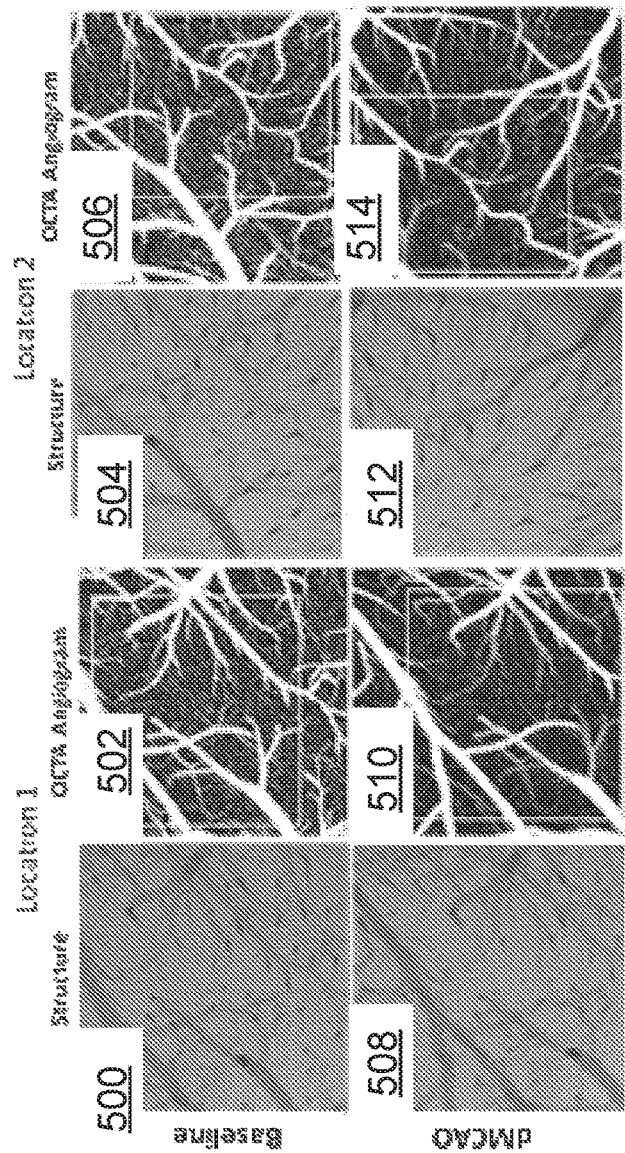
Figure 5
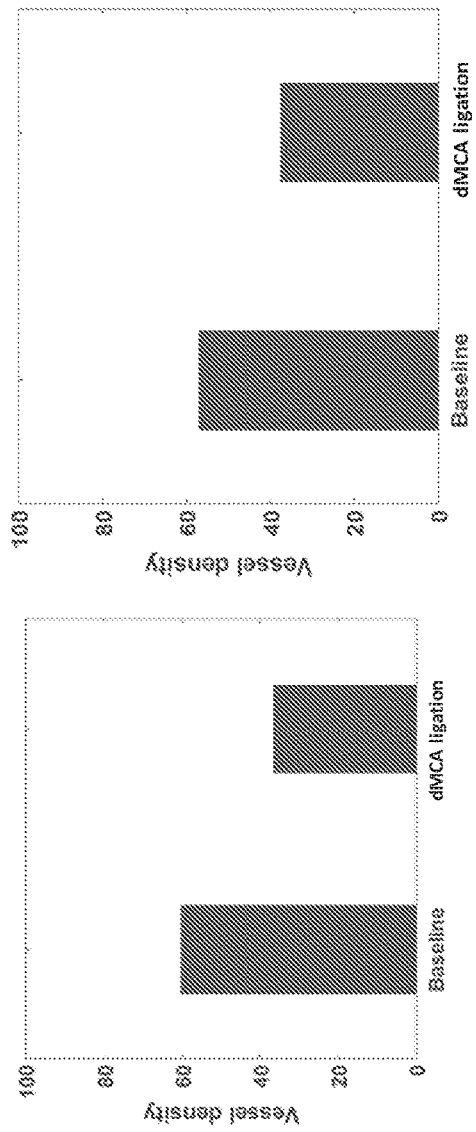
Figure 6a
Figure 6b

Table 1. Metrics comparisons

| | Metric | vED | aED | bED |
|---|---|---|---|---|
| Maximum projection | SNR | 2.0837 | 2.0934 | 2.1958 |
| | Contrast | 2.6313 | 3.0333 | 3.2424 |
| | Connectivity | 65.0350 | 60.9130 | 55.1121 |

METHODS AND SYSTEMS FOR ENHANCING OPTICAL IMAGE QUALITY

CROSS-REFERENCE TO RELATED APPLICATIONS

This application is a U.S. national phase of International Application No. PCT/US2017/052869, filed on Sep. 22, 2017, which claims priority to U.S. Provisional Application No. 62/398,163, filed Sep. 22, 2016, both of which are incorporated by reference herein in their entirety.

BACKGROUND

Tissue perfusion imaging has many clinical applications and can be used to image cerebrovascular perfusion, ocular microcirculation, skin microcirculation, disease progression, vascular imaging, or angiography, as examples. Quantifying capillary blood flow in conjunction with such images aids in maintaining tissue integrity under both healthy and diseased conditions.

Various optical imaging techniques are used to image and analyze biological tissues in vivo. One technique, optical microangiography (OMAG), is an optical coherence tomography (OCT) based imaging technique used for angiographic imaging of biological tissues in vivo. The OMAG method extracts blood flow information based on a direct differentiation of complex or intensity OCT signals between repeated B-scans acquired at the same cross-section. The OMAG method is sensitive to blood cell movement and thereby provides a high imaging resolution.

However, in OMAG, the acquired signals from static background within repeated B-scans are not exactly the same due to, for example, sample movement, cellular movement, system noise, and stability in scanning mechanisms. Thus, the angiographic results not only contain flow information but also bear static signals from bulk tissue and noise. Such "false flow" is difficult to differentiate from real blood flow based on flow images alone.

Laser speckle imaging (LSI) is an imaging technique that is also used for imaging of biological tissues in vivo. However, this technique also comprises background tissue components, making visualization of slow blood flows difficult.

SUMMARY

In accordance with the present invention, a system and a method are defined for enhancing quality of a flow image of a sample. In one embodiment, the computer-implemented method may comprise acquiring a first flow image from a plurality of optical image scans of the sample. The sample comprises a biological tissue having fluid flow therethrough. The method includes generating a vector from the plurality of optical image scans, the vector comprising tissue components, flow components, and noise, and estimating eigenvectors and eigenvalues from the vector. The method then includes isolating the flow components from the tissue components by application of an eigen regression filter for a determined number of the eigenvectors and then removing the tissue components in the first flow image. Removing the tissue components in the first flow image contrasts blood flow from static tissue within blood-perfused tissue.

The fluid flow may be a blood flow, and the method may further comprise quantifying blood perfusion within the biological tissue in the image, including but not limited to calculating a mean capillary flow velocity and capillary flow heterogeneity.

In one example embodiment, generating the vector from the plurality of optical image scans may comprise modeling signals from the plurality of optical image scans as a sum of at least three independent Gaussian processes comprising the tissue components, the flow components, and the noise. The determined number of eigenvectors may represent the flow components and be based on the number of optical image scans performed.

In one example embodiment, the plurality of optical image scans are generated by optical coherence tomography and are OMAG scans. Acquiring the first flow image from the plurality of optical image scans of the sample may comprise generating the first flow image from a plurality of repeated B-scans of the sample.

In another example embodiment, the plurality of optical image scans are generated by one of laser speckle imaging, laser Doppler imaging, confocal microscopy, multiphoton microscopy, holography, motion contrast photography, and fluorescence imaging.

In another example embodiment, an OMAG apparatus configured to generate images from living tissue is provided. The apparatus comprises a non-transitory computer-readable medium having stored therein instructions executable by a computing device to cause the computing device to perform functions to extract tissue motion from the generated images, the functions comprising: acquiring a first flow image from a plurality of OMAG scans of the sample, wherein the sample comprises a biological tissue having fluid flow therethrough, generating a vector from the plurality of OMAG scans, the vector comprising tissue components, flow components, and noise, estimating eigenvectors and eigenvalues from the vector, isolating the flow components from the tissue components by applying an eigen regression filter for a determined number of the eigenvectors, and removing the tissue components in the flow image. The OMAG scans may comprise a plurality of adjacent B-scans of the sample. In another embodiment, OMAG scans may comprise a plurality of adjacent 3D scans of the sample.

In some example embodiments, the sample comprises one of the following: a brain, an eye, a retina, a tumor, a heart, skin, a kidney, an oral cavity, a gastroenterology tract, a respiratory tract, a reproductive system, and a cochlea.

The method may be used in imaging cerebrovascular perfusion, ocular microcirculation, skin microcirculation, disease progression, vascular imaging, or angiography, among other applications.

These as well as other aspects and advantages of the synergy achieved by combining the various aspects of this technology, that while not previously disclosed, will become apparent to those of ordinary skill in the art by reading the following detailed description, with reference where appropriate to the accompanying drawings.

BRIEF DESCRIPTION OF THE FIGURES

FIG. 4a depicts a structural OCT image of the sample of FIG. 3a, in accordance with at least one embodiment;

FIG. 4b depicts a static tissue image of the sample of FIG. 3a, in accordance with at least one embodiment;

FIG. 4c depicts an OCTA flow image of the sample of FIG. 3a, in accordance with at least one embodiment;

FIG. 4d depicts a graph plotting power of OCTA signals over velocity for the channels of the sample of FIG. 3a, in accordance with at least one embodiment;

FIG. 4e depicts a graph plotting velocity over mean frequency within the channels of the sample of FIG. 3a, in accordance with at least one embodiment;

FIG. 5 depicts structural and flow images of a mouse brain at two locations after application of an eigen-decomposition (ED) filter, in accordance with at least one embodiment;

FIGS. 6a-b depict graphs plotting vessel density for baseline and artery ligation at the two locations imaged in FIG. 5, in accordance with at least one embodiment;

FIG. 11 depicts a table providing metrics for the angiograms of FIGS. 10a-c, in accordance with at least one embodiment;

DETAILED DESCRIPTION

Figure 1:
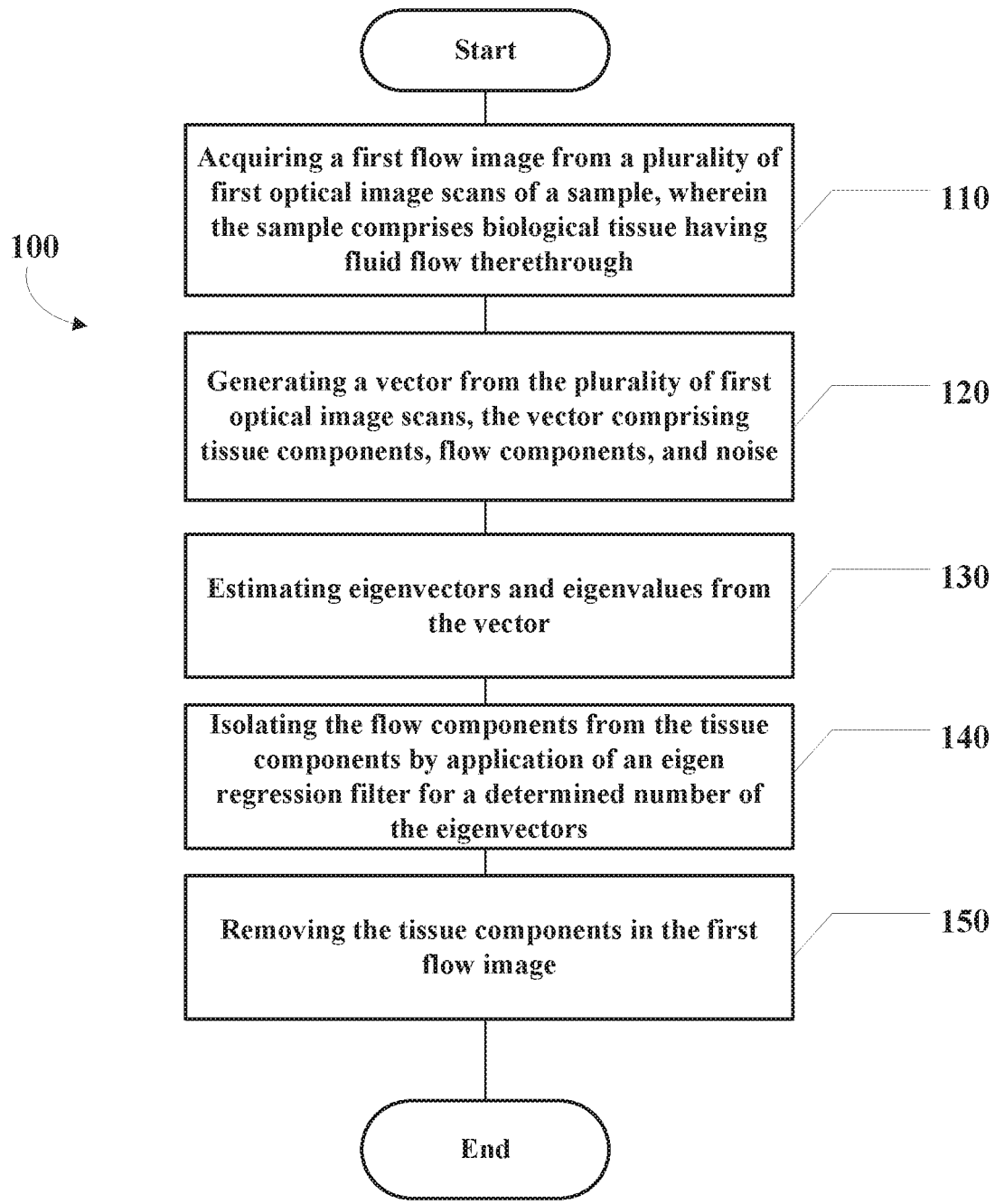
FIG. 1 depicts a simplified flow diagram of an example method that may be carried out to enhance quality of a flow image of a sample, in accordance with at least one embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Optical imaging provides for the visualization of functional blood vessels noninvasively and thus the investigation of dynamic blood flow within microcirculatory tissue beds in vivo. Examples of optical imaging techniques include optical coherence tomography (OCT), OMAG, laser speckle imaging, laser Doppler imaging, confocal microscopy, multiphoton microscopy, holography, motion contrast photography, and fluorescence imaging, among others.

Moving cells within blood act like scattering particles that give a dynamic OCT signal. The OCT signal captured from the moving blood cells over time at one spatial location is a time-varying signal, and depends on the direction and velocity of the blood cells passing through the OCT beam. Each blood cell contributes to the total received time-varying OCT signal, i.e. the dynamic speckle signal, which is of a mean frequency and a finite frequency bandwidth due to the limited observation time related to the movement through the sample volume. The mean frequency of the dynamic OCT signal relates to the mean velocity of blood cell movement within a tissue bed.

The bulk tissue movement also contributes to frequency components of the OCT signals. Compared to the dynamic signal from moving blood, the signal from bulk tissue generally comprises a lower frequency.

Whole blood (red cells, white cells, and platelets suspended in plasma) comprises about 3-7% of total tissue volume in a living body of a subject; thus, it is the bulk tissue and not the flow of blood that dominate a volume of a given sample.

A statistical-analysis approach of eigen-decomposition (ED)-based analysis extracts the dynamic OCT signals due to moving blood cells, upon which to statistically estimate the mean frequency and frequency bandwidth of eigenvalues related to the red blood cell moving velocity. The mean frequency and frequency bandwidth indicate the mean velocity and the velocity heterogeneity, respectively, of the blood flow within capillary tissue beds of the scanned tissue volume.

The methods described herein provide both clearer images indicating flow, as well as quantitative information about the capillary blood flow, which is often required if one wants to understand how microcirculation works to maintain tissue integrity under both healthy and diseased conditions.

FIG. 1 depicts a simplified flow diagram of an example method 100 that may be carried out to enhance quality of a flow image of a sample, in accordance with at least one embodiment.

As referenced herein, the sample may be in a subject such as a human subject, and may be an adult human subject, an adolescent human subject, an infant human subject, or a newborn human subject. The sample may be an in vivo sample.

For the method 100 and other processes and methods disclosed herein, the flowchart shows functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, data storage including a one or more computer-readable storage media that may be read or accessed by the processor, and may be a fixed or removable hard drive, a flash memory, a rewritable optical disk, a rewritable magnetic tape, or some combination of the above. The computer readable medium may include a physical and/or non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage system. The computer readable medium may be considered a computer readable storage medium, a tangible storage device, or other article of manufacture, for example. Alternatively, program code, instructions, and/or data structures may be transmitted via a communications network via a propagated signal on a propagation medium (e.g., electromagnetic wave(s), sound wave(s), etc.).

Initially, the method 100 includes acquiring a first flow image from a plurality of optical image scans of a sample, wherein the sample comprises biological tissue having fluid flow therethrough, at block 110.

In one example embodiment, a plurality of adjacent B-scans of the sample may be used as the plurality of optical image scans to obtain a time-varying signal. The time-varying signal comprises three components: static tissue components, dynamic signals due to moving blood cells, and system noise. Multiple scans at the same spatial location may be acquired to build a time series of B-scans. In one example embodiment, entire B-scans may be treated as a "voxel" for application of eigen-decomposition (ED) analysis, denoted as bED. Because the percentage of blood volume within living tissue is less than 7%, each "voxel" is dominated by the bulk tissue components.

In an alternative embodiment, the method 100 may be carried out based on A-scans, wherein an A-scan is treated as a "voxel" for application of ED analysis, and is denoted as aED. In yet another embodiment, the method 100 may be carried out based on 3D-scans, wherein a 3D-scan is treated as a "voxel" for application of ED analysis.

The method 100 then includes generating a vector from the plurality of optical image scans, the vector comprising tissue components, flow components, and noise, at block 120.

Assuming there are N repeated scans captured at one location, the scan signals can be collectively expressed as a 2-D vector form:

$$x=[x(1),x(2),\ldots,x(N)]^T \qquad (1)$$

where N is the ensemble size with x(i) representing the $i^{th}$ scans (i=1, 2, . . . , N). The superscript T denotes matrix transposition.

Being a sum of the signals from a large number of independent scatters, the central limit theorem applies, indicating that x is a zero mean Gaussian random process. The vector x has a complex Gaussian probability density function with zero mean given by:

$$f_x(x) = \frac{1}{\pi^H |R_x|} e^{-x^{*T} R_x^{-1} x} \qquad (2)$$

where $x^{*T}$ is the complex conjugated transpose (Hermitian transposition) of x and the correlation matrix $R_x$ is defined by:

$$R_x=E\{xx^{*T}\} \qquad (3)$$

where E{*} is the expectation of the argument.

An OCT signal, x, is the summation of the static component ($x_s$), moving blood components ($x_b$), and white noise ($x_n$). The signal of each vector may be given by:

$$x=x_s+x_b+x_n \qquad (4)$$

The goal is to separate the moving blood signals, $x_b$, from x.

Assuming that these three signal components are statistically un-correlated to each other, the correlation matrix of Equation 4 may then be given by following:

$$R_x=R_s+R_b+\sigma_\omega^2 I \qquad (5)$$

where $R_s$ is the static correlation matrix, $R_b$, is the moving blood correlation matrix, $\sigma_\omega^2$ is the noise variance, and/is an N×N identity matrix.

The method 100 then includes estimating eigenvectors and eigenvalues from the vector, at block 130.

To separate the OCT signals into its signal subsets, the Discrete Karhunen-Loeve transform (DKLT) may be utilized, which orthogonally decomposes a general non-stationary random signal and can be considered as a generalization of conventional Fourier analysis for non-stationary random processes. The DKLT is based on an eigenvector decomposition of the correlation matrix, where the eigenvectors and eigenvalues are achieved by solving the equation:

$$R_x e_i=\lambda_i e_i \qquad (6)$$

The correlation matrix $R_x$ is Hermitian symmetric and positive semidefinite. It is then possible to find N orthonormal eigenvectors $e_1, e_2, \ldots, e_N$ and corresponding eigenvalues $\lambda_1, \lambda_2, \ldots, \lambda_N$, which are real and non-negative. The correlation matrix may be written with eigenvalues and eigenvectors in the form:

$$R_x=E\Lambda E^{*T} \qquad (7)$$

where T is the Hermitian transpose operation and $\Lambda$ and E are the eigenvalue ($\lambda_1 > \lambda_2 > \ldots > \lambda_N$) and eigenvector matrices, respectively, defined by:

$$A = \begin{bmatrix} \lambda_1 & 0 & \cdots & 0 \\ 0 & \lambda_2 & \cdots & 0 \\ \vdots & \vdots & & \vdots \\ 0 & 0 & \cdots & \lambda_N \end{bmatrix}, \; E = \begin{bmatrix} | & | & & | \\ e_1 & e_2 & \cdots & e_N \\ | & | & & | \end{bmatrix} \qquad (8)$$

$\Lambda$ is the N×N diagonal matrix of eigenvalues, which are sorted in descending order. E is the N×N unitary matrix of eigenvectors. The total energy in the received OCT signal equals to the sum of all the eigenvalues. Thus, the eigenvalue distribution is a measure of the signal spectrum. In this case, the eigenvalue spectrum is a generalization of the Fourier power spectrum.

The method then includes isolating the flow components from the tissue components by application of an eigen regression filter for a determined number of the eigenvectors, at block 140.

Each eigenvector and its corresponding eigenvalue represents a subset of the signal to be analyzed. The highest eigenvalue contains the highest energy content of the signal. The eigenvector of the highest eigenvalue describes the spectral content of the signal with highest energy. The frequency transform of the eigenvector gives the spectrum of the corresponding signal component. Therefore, each eigenvector is related to a specific frequency band.

From the eigenvalue/energy spectrum, the static signal originates from stationary and slowly moving tissue or particles, which dominates in the low frequency and concentrates in a few eigenvalues corresponding to low frequency eigenvectors. The signal from the faster moving blood has most of the energy concentrated along eigenvectors with higher frequency components. The noise has equal energy along all of the eigenvectors. Therefore, the static component can be maximally suppressed to retain the flow signals with minimal distortion through applying the eigen regression filtering, where the filter is used to identify and remove eigen-components that represent static tissue signal.

Because the static tissue components dominate X, they contribute to the first Kc eigen-components. Assuming that Kc eigen-components correspond to static tissue signal, the eigen regression filter can be interpreted as having a filter order of (Kc−1). For rodent brain imaging, for example, Kc=1 would be sufficient to remove the static signals from the OCT signals in order to contrast the blood flow. This static tissue signal suppression approach is inherently adaptive to the A-scans (or repeated B-scans) because its attenuation response of the regression filter is defined according to the eigen-components in the ensemble signal composition. The power spectrum of the signal is the Fourier transform of the autocorrelation function defined by:

$$G_x(\omega) = \int_{-\infty}^{\infty} R_x(\tau) e^{-i\omega\tau} d\tau \quad (9)$$

If the frequency components have spectral support on the interval (−π,π), the signal power indicating the presence of blood flow, the OCTA signal, may be simplified as the following:

$$P = \int_{-\pi}^{\pi} G(\omega) d\omega \quad (10)$$

The mean frequency (MF) of signal frequency spectrum, $\omega_m$, representing the mean velocity of blood flow within scanned tissue volume and the frequency bandwidth (BF), $B^2$, of the frequency spectrum, which is related to the flow fluctuation (temporal heterogeneity of flow) may be defined by following:

$$\omega_m = \frac{1}{P}\int_{-\pi}^{\pi} \omega G(\omega) d\omega, \text{ and } B^2 = \frac{1}{P}\int_{-\pi}^{\pi} (\omega - \omega_a)^2 (G\omega) d\omega \quad (11)$$

The estimation of spectral moments can be obtained using the well-known lag-one autocorrelation equation given by following:

$$\omega_k = \frac{FPS/2}{2\pi} \arg\{R(1)_k\}, \text{ for } R(1)_k = \frac{1}{N_D - 1}\sum_{m=0}^{N_D-2} e_k^*(m)e_k(m+1) \quad (12)$$

where $R(1)_k$ is the lag-one autocorrelation value for the kth eigenvector, FPS the sampling rate, and ND the number of eigenvectors.

The method then includes removing the tissue components in the first flow image, at block 150. The tissue components may be removed by suppression of the components from the first flow image. Examples of images before and after removal of the tissue components via a method such as the method 100 are depicted in FIGS. 4a-c and images 500-514 of FIG. 5.

The method 100 provides for a non-invasive, efficient, and effective differentiation of flow signals from static bulk tissue, which may be used to then suppress the unwanted bulk tissue and thus enhance the quality of a flow image. The method 100 is a highly efficient approach to contrast functional blood vessel networks within microcirculatory tissue beds in vivo; by treating optical scans as a voxel and thus applying ED to entire scans, the computational time to produce a flow image is drastically reduced, all the while providing superior imaging. Because of the decreased computational time to produce a superior image, the method 100 may be practical for real time implementations.

A sample to be imaged may comprise the brain, a tumor, skin, a kidney, a gastroenterology tract, a productive system, and a cochlear, for example. Other parts of the human body may also be imaged using the method 100. The method 100 may be performed for a number of biomedical imaging applications, such as in the imaging of cerebrovascular perfusion, retinal microcirculation, skin microcirculation, disease progression (e.g., tumor progression), posterior eye vascular imaging, or angiography, for example.

For method 100, the flow images may be the direct images from an OCT/OMAG system. In another embodiment, the flow images may be serial speckle frames obtained from laser speckle imaging. Still other imaging techniques to obtain suitable images for the application of method 100 may be envisioned.

Figure 2:
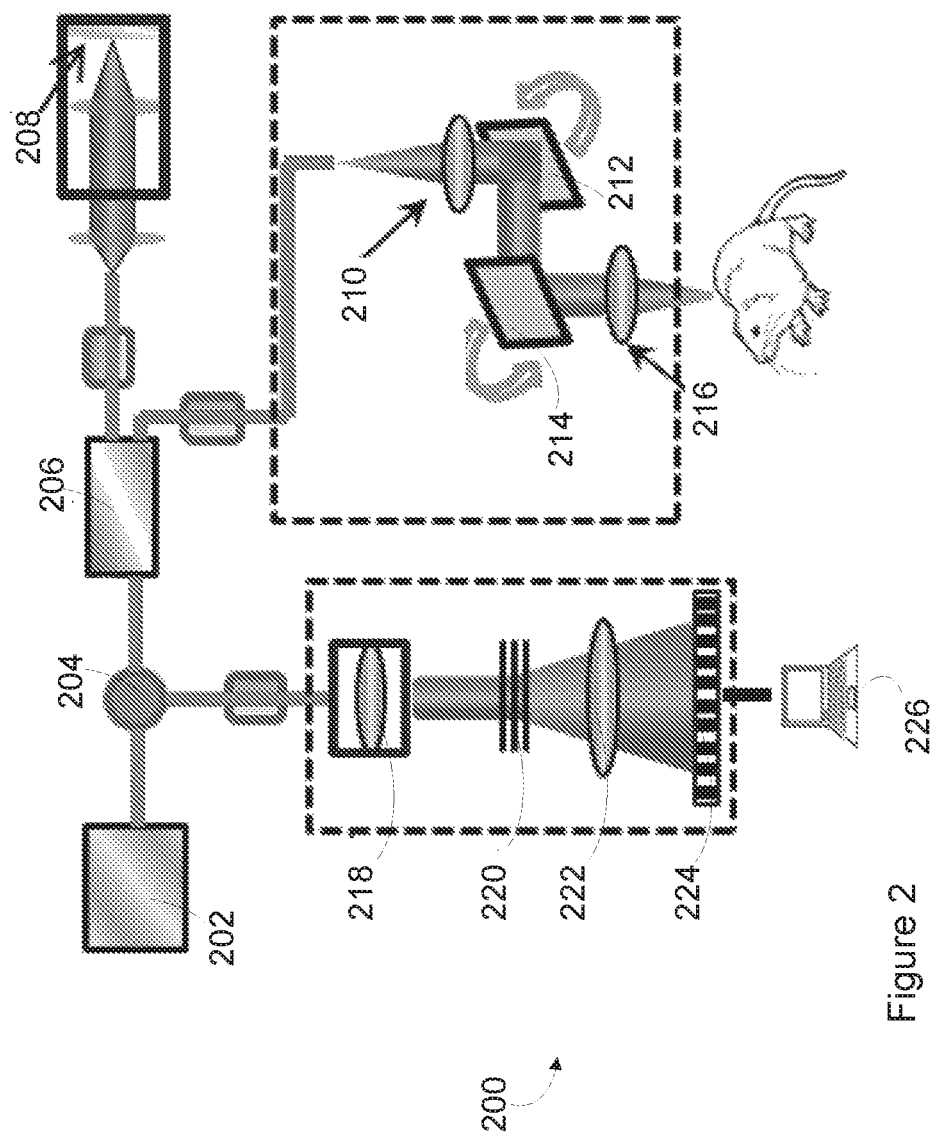
FIG. 2 depicts a schematic of an exemplary imaging system, in accordance with at least one embodiment.

FIG. 2 depicts a schematic of an exemplary imaging system 200, in accordance with at least one embodiment. The imaging system 200 is a spectral domain OCT system, comprising a superluminescent diode (SLD) 202, a circulator 204, a 2×2 fiber coupler 206, a mirror 208, a collimating lens 210, a y scanner 212, an x scanner 214, an objective lens 216, a collimator 218, a grating 220, a lens 222, and an InGaAs CCD camera 224, and a processing unit 226. The exemplary imaging system 200 may be used with the method 100, in one example embodiment. In another embodiment, the exemplary imaging system 200 may be a swept source OCT system.

II. Example Image Enhancement Methods a. OMAG

In a recent study, an eigen regression filter was generated and applied on optical image scans to extract dynamic OCT signals due to moving red blood cells. Such extractions may be used to calculate important parameters concerning the dynamic flow signal, including the power of the spectrum, the mean frequency and the bandwidth of the frequency of the blood flow, velocity, and the velocity bandwidth of blood flow.

In the study, an imaging system such as imaging system 200 was used. The imaging system was a fiber-based SD-OCT system that employed a superluminescent diode (SLD) having a central wavelength of 1,340 nm with a bandwidth of 110 nm, providing about 7 μm axial resolution in the air. In the sample arm, a 10× scan objective lens was used to deliver light onto the sample, achieving a lateral resolution of about 7 μm. The detection system was a fast spectrometer that employed a line scan camera with a line scan rate of 92 kHz to capture the spectral interferograms formed between the reference light and the sample light. With a probe light power of 3.5 mW at the sample surface, the system had a measured dynamic range of 105 dB. The operations for probe beam scanning, data acquisition, and data storage were controlled by a custom software package written in LabVIEW™.

An M-B scan protocol, i.e. repeated B-scan, was used on the SD-OCT system with a time interval ranging from 50 μs to 2.5 ms to detect both fast flow (defined as up to 5 mm/s) and slow flow (defined as about 100 μm/s). Such a wide range is because of the wide velocity range of capillary flow, from hundreds of micrometers per second to a few millimeters per second. 50 A-scans were used to repeat at the same spatial position with an A-scan rate of 20 kHz. 200 A-scans with a uniform spacing between adjacent A-scan positions, formed one B-scan in the fast axis (x direction) with an imaging region of 1.4 mm. In the slow axis (y direction), 200 B-scans with a uniform spacing between adjacent B-scan positions, were captured to cover 1.4 mm.

After 3D volumetric data acquisitions using this scanning protocol, a vascular image, mean frequency, and frequency bandwidth of blood flow were generated. The relatively large vessels (>30 µm) were excluded from the analysis because the flows in these vessels are likely so fast that they would exceed the flow measurement limit set at 5 mm/s using the current scanning protocol.

Figures 3A, 3B:
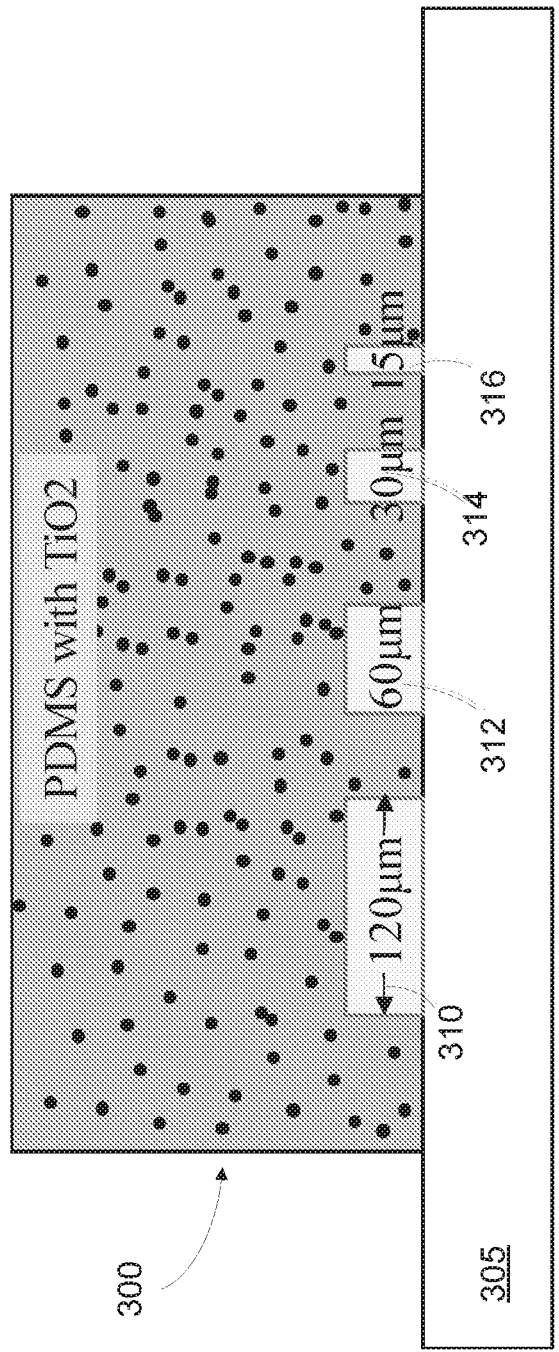
FIG. 3a depicts a cross-sectional view of a microfluidic phantom sample, in accordance with at least one embodiment.
FIG. 3b depicts a table listing the predictable flow rate and average velocity in each of the four channels of the sample of FIG. 3a at a range of pump rates, in accordance with at least one embodiment.

FIG. 3a depicts a cross-sectional view of a microfluidic phantom sample 300, in accordance with at least one embodiment. The scattering phantom, comprising a polydimethylsiloxane (PDMS)/TiO2 nanocomposite, consists of four equal-height (40 µm) microfluidic channels 310, 312, 314, and 316, each perfused with 5% Intralipid® solutions having pre-defined flow velocities, and positioned at an interface with a glass substrate 305. Channel 310 comprises a width of 120 µm, channel 312 comprises a width of 60 µm, channel 314 comprises a width of 30 µm, and channel 316 comprises a width of 15 µm.

The flow of 5% Intralipid® in the microfluidic channels was driven by an external precision syringe pump. Since the channel design was based on a dimidiate and symmetric strategy, the flow parameters in each sub-channel are predictable. Moreover, the symmetric design provides for a constant average flow velocity throughout each of the microfluidic channels.

FIG. 3b depicts a table 350 listing the predictable flow rate and average velocity in each of the four channels 310 at a range of pump rates. In table 350, channel 310 is referenced as D1, channel 312 as D2, channel 314 as D3, and channel 316 as D4.

FIG. 4a depicts a structural OCT B-scan image 400 of the scanned sample of FIG. 3a, in accordance with at least one embodiment. FIG. 4b depicts a static tissue B-scan image 410 of the scanned sample of FIG. 3a, in accordance with at least one embodiment. An ED filter, such as discussed above with reference to method 100, was applied to the 3D data acquired from the microfluidic phantom sample 300, and FIG. 4c depicts an optical coherence tomography based angiography (OCTA) flow image 420 of the scanned sample of FIG. 3a after application of the ED filter, in accordance with at least one embodiment.

Each eigenvector corresponds to a specific frequency or velocity in each channel. By averaging all the frequencies in each channel, the mean frequency can be obtained for each pump rate applied to the microfluidic channels. After calculating the signal power and mean frequency with different pump rates, the relationship of velocity with signal power/intensity and mean frequency was obtained and summarized in FIGS. 4d-e. FIG. 4d depicts a graph 430 plotting power/intensity of OCTA signals over velocity within four channels of the scanned sample of FIG. 3a, in accordance with at least one embodiment. In FIG. 4d, the signal power decomposed by the ED-quantification method is seen to increase with the increase of flow velocity and asymptotically approaches a plateau.

FIG. 4e depicts a graph 440 plotting mean frequency over velocity within the four channels of the scanned sample of FIG. 3a, in accordance with at least one embodiment. In FIG. 4e, the relationship between mean frequency and flow velocity among all the channels is shown to possess the same linear relationship with the squared Pearson correlation coefficient of 0.983 for the D1 channel 310, 0.982 for the D2 channel 312, 0.970 for the D3 channel 314, and 0.920 for the D4 channel 316, among all the velocities given. An approximate one-to-one relationship of mean frequency to the flow velocity regardless of channel size demonstrates that the ED-quantification method is able to accurately measure velocities in capillaries having different sizes.

The ED-quantification method was also able to detect the cerebral capillary response to ischemic injury (in a distal middle cerebral artery occlusion, dMCAO model). The capillary flows within cortical tissue beds should exhibit heterogeneity, and ischemic injury would modify this heterogeneous property. FIG. 5 depicts structural and flow en-face projection images from volumetric imaging results of a mouse brain at two locations after application of an ED filter, in accordance with at least one embodiment.

Two regions were selected in an affected brain region to provide quantitative assessments of the changes in cerebral vessel morphology and capillary flow response to the dMCAO. The purpose of this choice was to check the consistency of quantification because the responses in these two regions should be approximately the same.

The changes in cerebral tissue and blood vessel morphology before and after the dMCAO are summarized in images 500-514 of FIG. 5, obtained by an en-face projection of 3D results of scanned tissue volume. The scanning positions at two selected locations were shifted because the animal was required to remove from the imaging platform to the surgery table for the surgical ligation of the dMCA in order to induce dMCAO, and then place back to the imaging platform for next imaging session. The decrease of the blood flow and capillary density was clearly observed on OCTA images when comparing the results before, seen in images 500-506, and after the dMCA ligation, seen in images 508-514.

Quantitative analysis was performed to calculate the changes in vessel density before and after the dMCA ligation. The morphological parameter of vessel density was defined as the ratio of the area occupied by blood vessels to the total scanned area. Due to the shift of the scanned position, proper quantification required co-registration so that the comparison was made for the same region (the region of interest, ROI) before and after the dMCA ligation. The ROI co-registration is shown as the white boxes in the pair of images in images 502, 506, 510, and 514 of FIG. 5, upon which the vessel density was evaluated.

The results are shown in FIG. 6a and FIG. 6b for location 1 and the location 2, respectively. FIGS. 6a-b depict graphs 600 and 650 plotting vessel density for baseline and common carotid artery ligation at the two locations imaged in FIG. 5, in accordance with at least one embodiment. Both graphs depict an approximately 30 percent reduction in vessel density after the dMCA ligation, demonstrating that the dMCA ligation in the current experiment caused the cessation of $\sim\frac{1}{3}^{rd}$ capillary blood flow in the cortical tissue, giving rise to mild ischemia in the affected regions.

Figure 7:
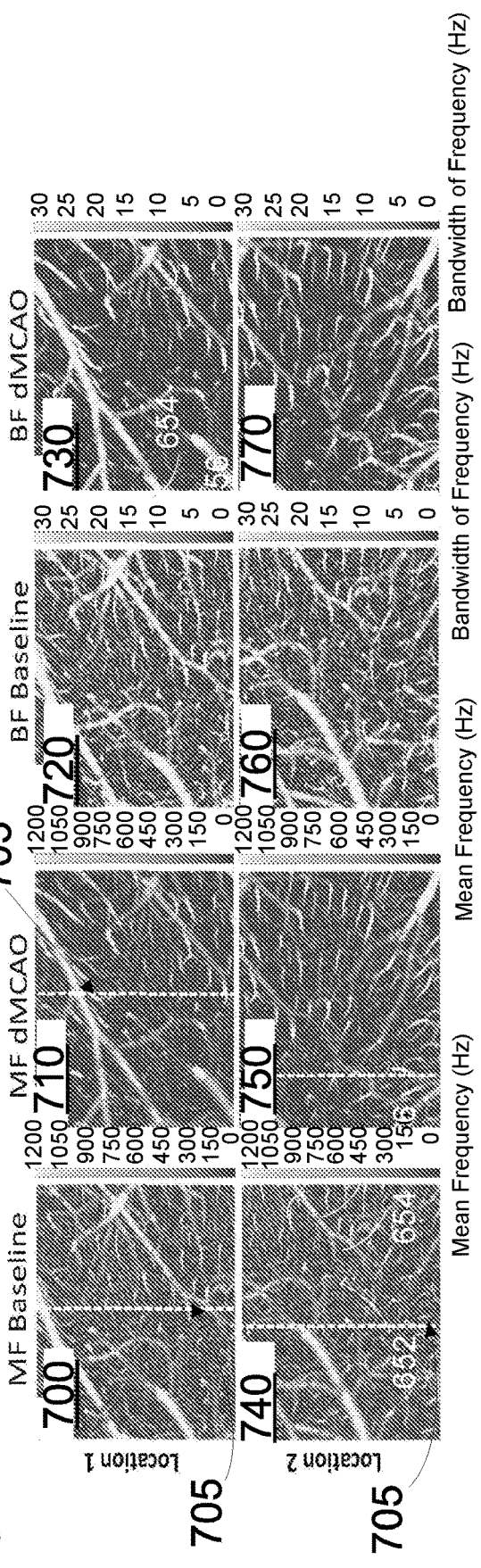
FIG. 7 depicts mean frequency maps and frequency bandwidth maps for the two locations imaged in FIG. 5, in accordance with at least one embodiment.

FIG. 7 depicts mean frequency maps and frequency bandwidth maps for the two locations imaged in FIG. 5, in accordance with at least one embodiment. The OCT angiogram images shown in FIG. 5 do not provide direct information about capillary velocity or flow information before and after ligation. With the ED-based quantitation algorithm, however, the reduction of capillary flows was observed on enface MF maps through comparing the results before ligation in images 700 and 740, and after ligation in images 710 and 750.

According to the microfluidic phantom study, the current scanning protocol with 20 kHz A-line rate is able to provide the measurement of the velocity range from 0 to 5 mm/s, in which range the velocity is linear with the mean frequencies (from 0 to about 2000 Hz). The MF range on the mouse brain shown in FIG. 7 is observed from 0 up to about 1200 Hz, which corresponds to the velocity in a range from 0 to about 3 mm/s.

Frequency bandwidth maps in images 720, 730, 760, and 770 reflect the temporal heterogeneity of capillary flows. This heterogeneous property is clearly observed in capillaries or penetrating capillaries, especially in the downstream of capillaries after dMCA ligation. Comparing the results before and after the dMCA ligation, the velocities of capillary flows were decreased with the induction of dMCAO in the brain region.

Figure 8:
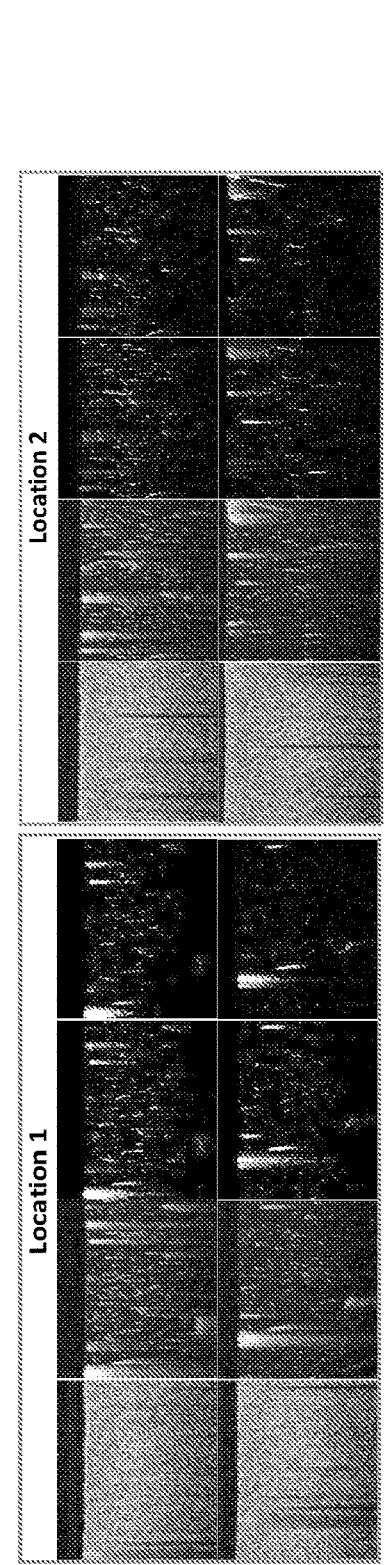
FIG. 8 depicts a series of cross-sectional images of structural, blood flow, mean frequency, and bandwidth for positions denoted in FIG. 7, in accordance with at least one embodiment.

FIG. 8 depicts a series of cross-sectional images of structural, blood flow, mean frequency, and its bandwidth at positions denoted in images 700, 710, 740, and 750 of FIG. 7, in accordance with at least one embodiment.

Figure 9:
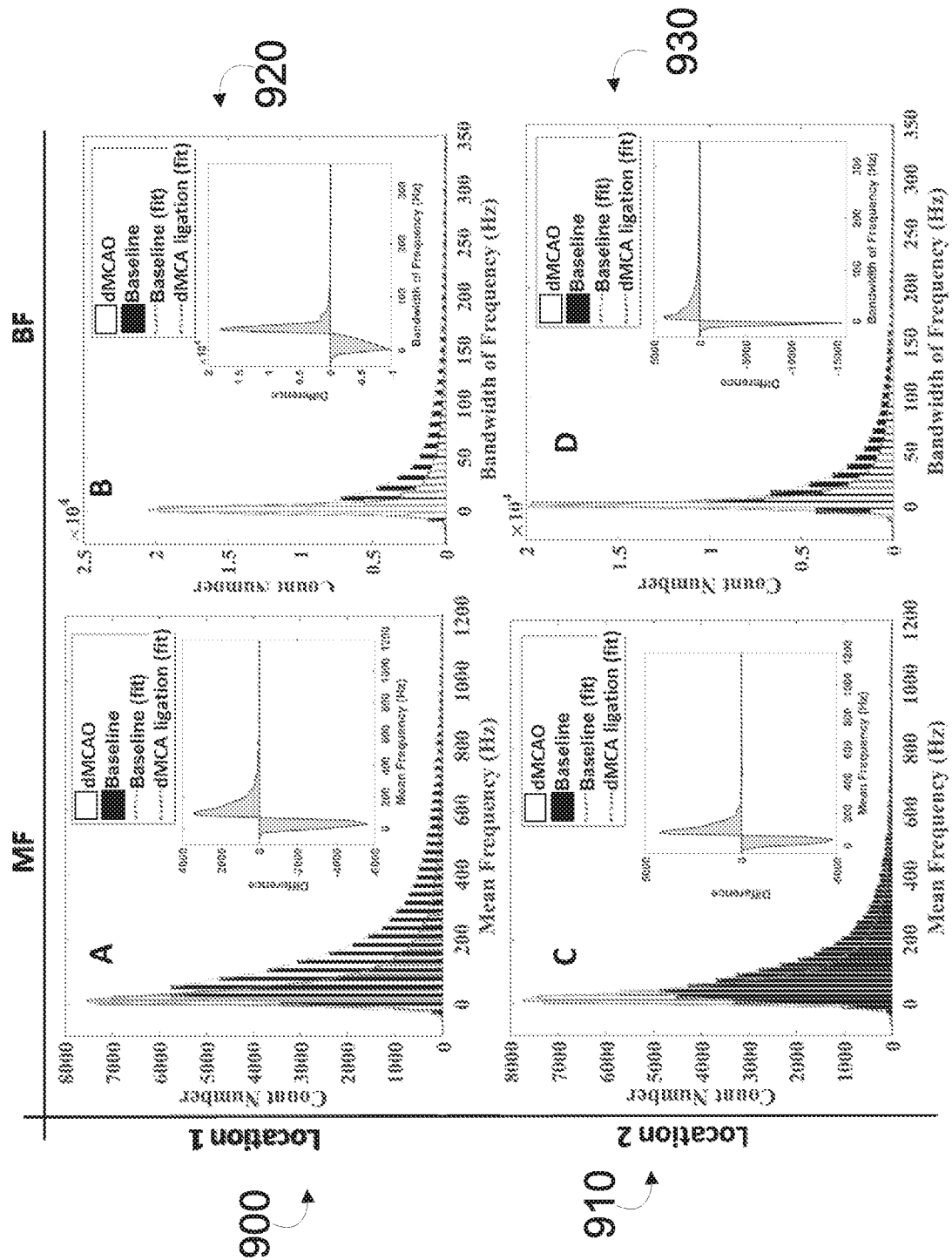
FIG. 9 depicts graphs plotting count number over mean frequency and bandwidth of frequency at the two locations of FIG. 5, in accordance with at least one embodiment.

FIG. 9 depicts graphs plotting count number over mean frequency and bandwidth of frequency at the two locations of FIG. 5, in accordance with at least one embodiment. Histogram distribution shows the spatial heterogeneity property of capillary flow in graphs 900 and 910 of FIG. 9. After the dMCA ligation, the reduction of capillary flows is clearly seen, but the capillary flows still possess the property of spatial heterogeneity. To show more clearly the how the capillary flow is reduced, we performed differentiation of the histogram functions between before and after the dMCA ligation. The results of which are provided as inserts in FIG. 9, where it can be concluded that after the dMCA ligation, the capillary flows in most of the capillaries are statistically moving to slow velocities, while the counts of faster flow velocity become less. The same is true for the temporal heterogeneity of the capillary flows in graphs 920 and 930. Such behavior of the capillary blood flow is characteristic for the ischemic injury because of the lack of perfusion from the distal middle cerebral artery.

In another OMAG system example, imaging of cerebral blood flow in mice was performed by the use of a spectral domain OCT system with an imaging speed of 92 kHz. The operating wavelength was 1310 nm and had a spectral bandwidth of about 80 nm. The volumetric dataset was captured with a scanning protocol covering a 2 mm by 2 mm area on the mouse cortex. Each B-scan consisted of 240 A-scans (in the x-axis) with 1024 pixels (in the z-axis) in each A-scan. In the slow scan y-axis, there were 240 positions. At each position, a number of repeated B-scans (N=8) were collected, upon which a method such as the method 100 described above was applied to separate moving signals due to flow from tissue signals. A single B-scan angiographic image was then formed.

Here, we compare the vascular imaging performance between conventional voxel-based (or pixel-based) ED (vED) and A-scan-based (aED) or B-scan-based ED (bED) methods. For conventional voxel-based ED method, 3 by 3 pixels were considered as a voxel in order to smooth the results. This treatment is appropriate because adjacent sample volumes within an imaging view of B-scan are more likely to share similar statistics, leading to a smoothing effect for final results.

Figure 10:
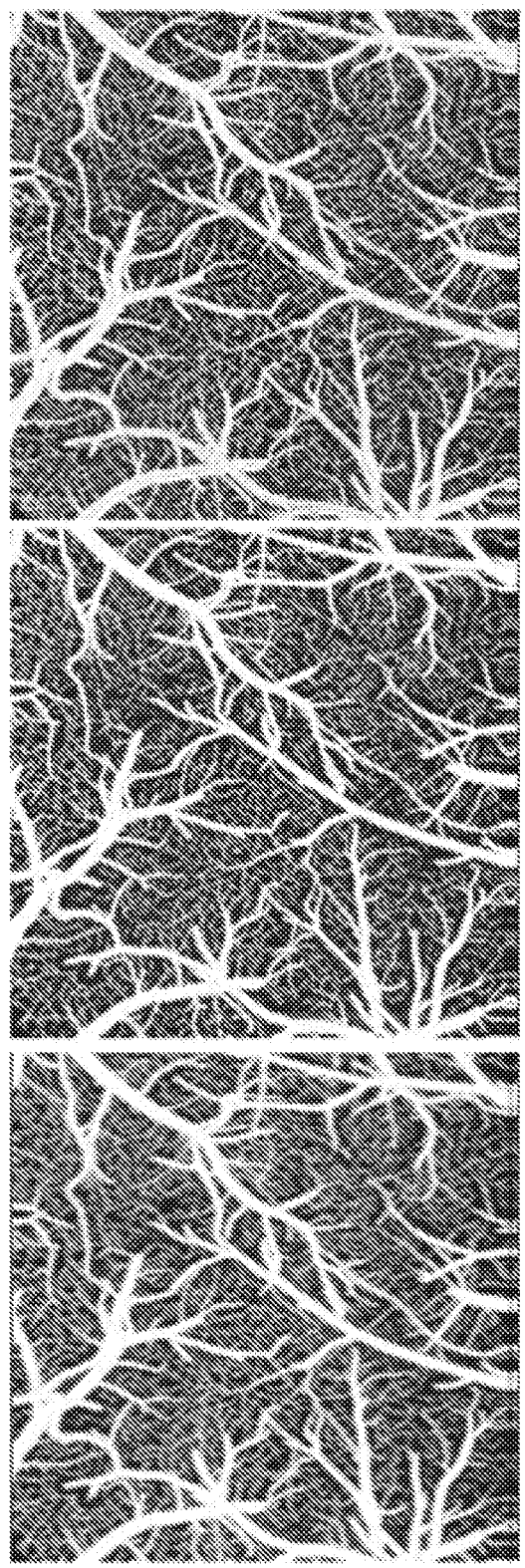
FIGS. 10a-c depict two dimensional enface angiograms after application of ED filters, in accordance with at least one embodiment.

FIGS. 10a-c depict two dimensional enface angiograms after application of ED filters, in accordance with at least one embodiment. Two dimensional enface angiograms were generated by projecting the three dimensional ED-OMAG values along a depth of 0.5 mm from the cortical surface. The 0.5 mm depth was selected because the OCT signal attenuation is not significant at this range. The results are shown in FIGS. 10a-c, where the images resulted from use of the maximum intensity projection.

Quantitative evaluations of the angiograms were performed. FIG. 11 depicts a table 1100 providing metrics for the angiograms of FIGS. 10a-c, in accordance with at least one embodiment. Three metrics are tabulated in FIG. 11: imaging signal to noise ratio (SNR), image contrast to noise ratio, and vessel connectivity. As shown in table 1100, ED analysis based on entire A-scans (aED) and ED analysis on entire B-scans (bED) have larger values in signal-to-noise ratio (SNR) and contrast than voxel-based ED (vED), indicating they have better performance in those categories. The lower values of vessel connectivity in aED and bED mean better performance in vasculature connectivity. The better performance for aED and bED confirms that applying entire B-scans or A-scans in ED analysis results in better statistical classification between flow and tissue signals than use of a single pixel or voxel, as in vED.

Figure 12:
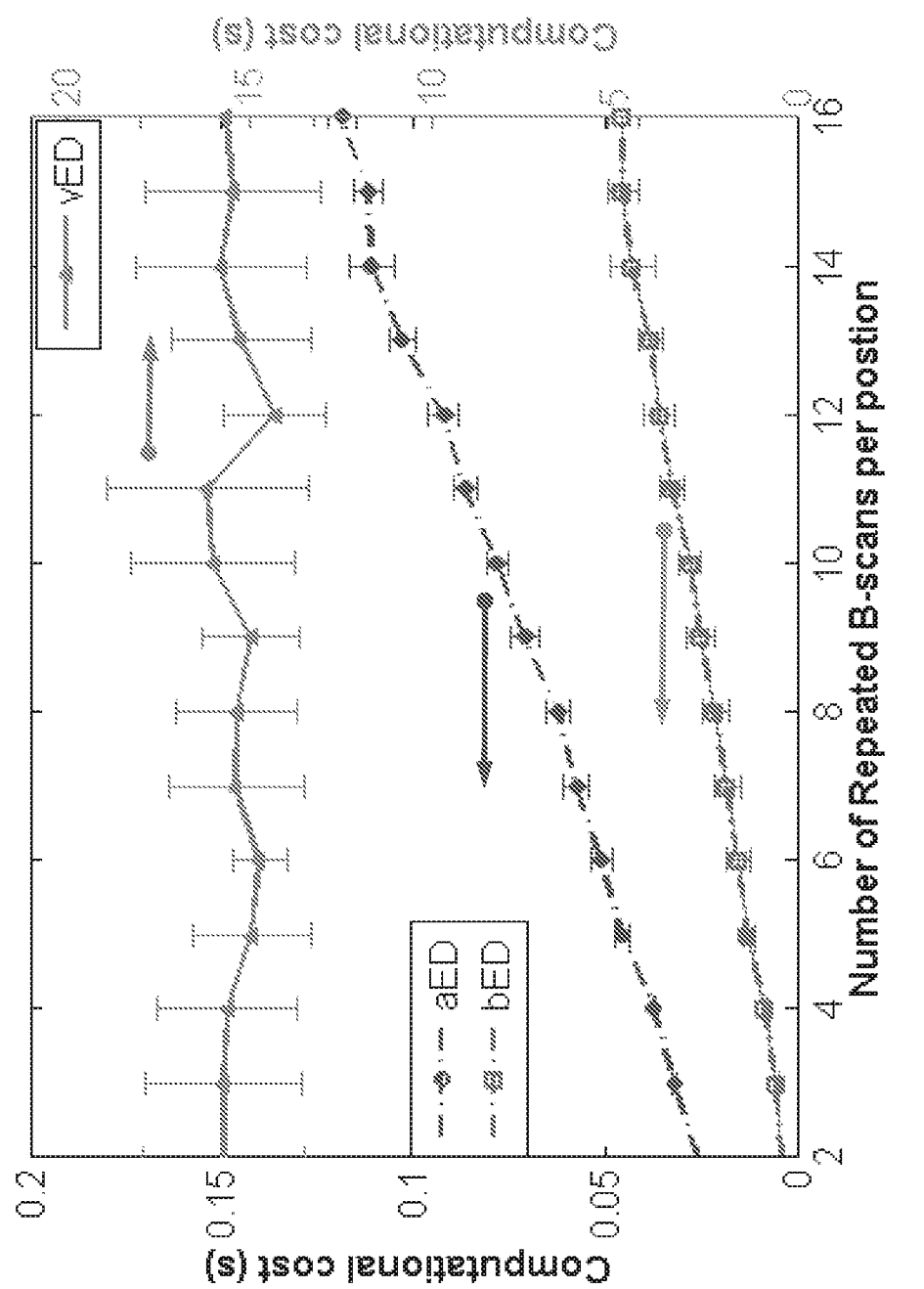
FIG. 12 depicts a graph plotting computational cost over number of repeated B-scans per position, in accordance with at least one embodiment.

FIG. 12 depicts a graph 1200 plotting computational cost over number of repeated B-scans per position, in accordance with at least one embodiment. Graph 1200 illustrates the computation time needed for producing a cross sectional (B-scan) flow image by applying each algorithm on a range of N from 2 to 16. ED algorithms were coded in MATLAB® processing language, running on a Windows® 7 Pro computer using an Intel® Xeon E5345 (2.33 GHz) processor with 16 GB of random access memory (RAM). The blood flow signals were extracted from the measured complex OCT signals by taking the first eigen-component as the static tissue signal. Average and standard deviation of computational times were reported for 400 randomly selected B-scans. The resulting computational costs with error bars are plotted in graph 1200 as a function of repetition numbers of B-scans needed to produce the blood flow B-scan for vED, aED, and bED algorithms, respectively.

In can be seen in graph 1200 that the vED algorithm takes roughly a constant time, about 15 seconds, to generate a cross-sectional flow image for all N. However, the computational times for aED and bED algorithms increases with the increase of B-scan repetitions. A significant computational cost saving is shown for bED, which only requires about ⅓ of the computational time of aED and ¹⁄₅₀ of the computational time of vED. Thus, bED is more practical than aED or vED for real time implementation of statistical ED of measured optical image signals for OCT based angiography.

b. Laser Speckle Imaging

In another study, a simple transmission laser-speckle imaging (LSI) system was prepared, in which a collimated beam from a laser diode was used to illuminate a sample from the bottom. Diffused transmitted light was then collected by a zoom lens and relayed onto a CCD camera. With an acquisition rate of 125 frames per second and an exposure time of 0.2 ms, the CCD camera recorded continuously the fluctuating speckle intensity caused by moving red blood cells.

A mouse ear pinna was used for the experiment, and a method such as the method 100 was applied, using eigen regression such as that described with reference to Equations 1-12, to extract the moving speckle signals to map blood perfusion within tissue.

Figure 13:
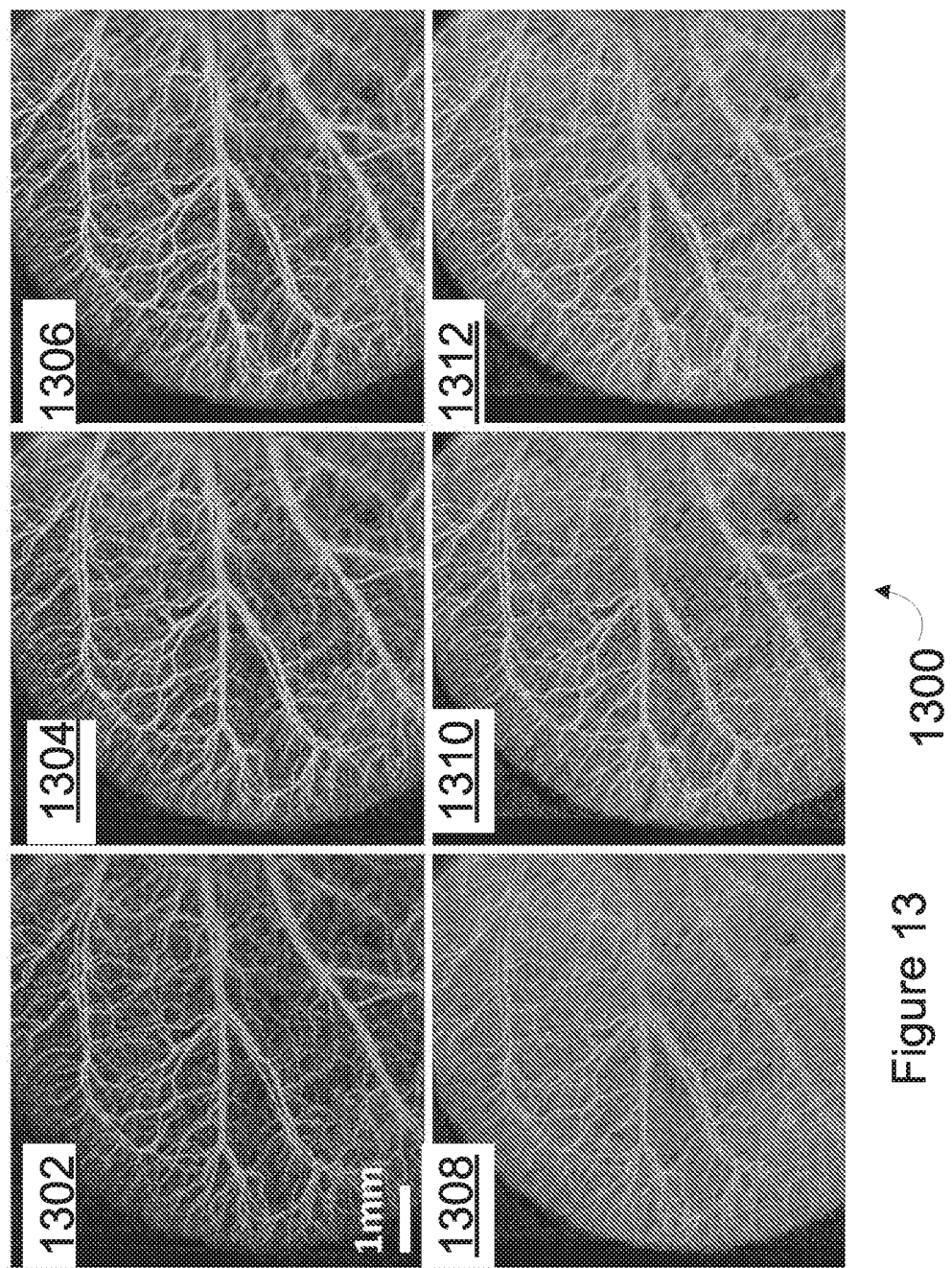
FIG. 13 depicts a series of images obtained from an ED-based method, such as the method of FIG. 1, and a series of images obtained from conventional methods, in accordance with at least one embodiment.

FIG. 13 depicts a series of images obtained from an ED-based method, such as the method 100 of FIG. 1, and a series of images obtained from conventional methods, in accordance with an example embodiment. FIG. 13 shows images 1302, 1304, and 1306 obtained from N=4, 8, and 16, respectively. Images 1302-1306 show not only arterioles and venules but also micro-vessels resolved, with the main-branch vessels appearing brighter, likely due to faster blood flow through these vessels. For comparison, the speckle images using conventional LSI methods are depicted as well in images 1308, 1310, and 1312 of FIG. 13. As can be seen from a comparison of images 1302, 1304, and 1306 with respect to images 1308, 1310, and 1312, the ED-based method more effectively extracts the dynamic speckle signal of slow blood flow thanks to the elimination of the static tissue components in the reconstruction of the angiographic images.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method for enhancing quality of a flow image of a sample comprising:
    acquiring a first flow image from a plurality of optical image scans of a sample, wherein the sample comprises a biological tissue having fluid flow therethrough, the fluid flow being a blood flow;
    generating a vector from the plurality of optical image scans, the vector comprising tissue components, flow components, and noise;
    estimating eigenvectors and eigenvalues from the vector;
    isolating the flow components from the tissue components by application of an eigen regression filter for a determined number of the eigenvectors;
    removing the tissue components in the first flow image; and
    quantifying blood perfusion within the biological tissue, wherein quantifying blood perfusion within the biological tissue comprises calculating a mean capillary flow velocity and capillary flow heterogeneity.

2. The method of claim 1, wherein acquiring the first flow image from the plurality of optical image scans of the sample comprises:
    acquiring repeated optical image scans at a single location on the sample; and
    generating a time series of the optical image scans.

3. The method of claim 1, wherein the vector is a two-dimensional vector.

4. The method of claim 1, wherein generating the vector from the plurality of optical image scans comprises modeling signals from the plurality of optical image scans as a sum of at least three independent Gaussian processes comprising the tissue components, the flow components, and the noise.

5. The method of claim 1, wherein the determined number of the eigenvectors is based on the number of optical image scans performed.

6. The method of claim 1, wherein the eigenvectors that comprise the determined number of the eigenvectors represent the flow components.

7. The method of claim 1, wherein the plurality of optical image scans are generated by optical coherence tomography and are optical microangiography (OMAG) scans.

8. The method of claim 7, wherein acquiring the first flow image from the plurality of optical image scans of the sample comprises generating the first flow image from a plurality of repeated 8-scans of the sample.

9. The method of claim 1, wherein the plurality of optical image scans are generated by one of laser speckle imaging, laser Doppler imaging, confocal microscopy, multiphoton microscopy, holography, motion contrast photography, and fluorescence imaging.

10. The method of claim 1, wherein removing the tissue components in the first flow image contrasts blood flow from static tissue within blood-perfused tissue.

11. A system for in vivo imaging, comprising:
    an optical micro-angiography (OMAG) apparatus configured to generate images from living tissue; and
    a non-transitory computer-readable medium having stored therein instructions executable to cause a computing device to carry out the method of claim 1.

12. An optical micro-angiography (OMAG) apparatus configured to generate images from living tissue; and
    a non-transitory computer-readable medium having stored therein instructions executable by a computing device to cause the computing device to perform functions to extract tissue motion from the generated images, the functions comprising:
    acquiring a first flow image from a plurality of OMAG scans of the sample, wherein the sample comprises a biological tissue having fluid flow therethrough, the fluid flow being a blood flow;
    generating a vector from the plurality of OMAG scans, the vector comprising tissue components, flow components, and noise;
    estimating eigenvectors and eigenvalues from the vector;
    isolating the flow components from the tissue components by application of an eigen regression filter for a determined number of the eigenvectors; and
    removing the tissue components in the flow image; and
    quantifying blood perfusion within the biological tissue, wherein quantifying blood perfusion within the biological tissue comprises calculating a mean capillary flow velocity and capillary flow heterogeneity.

13. The apparatus of claim 12, wherein the plurality of OMAG scans of the sample comprises a plurality of adjacent 8-scans of the sample.

14. The apparatus of claim 12, wherein acquiring the first flow image from the plurality of OMAG scans of the sample comprises:
    acquiring repeated OMAG scans at a single location on the sample; and
    generating a time series of the OMAG scans.

15. The apparatus of claim 12, wherein the determined number of the eigenvectors is based on the number of OMAG scans performed.

16. The apparatus of claim 12, wherein generating the vector from the plurality of OMAG scans comprises modeling signals from the plurality of OMAG scans as a sum of three independent Gaussian processes comprising the tissue components, the flow components, and the noise.

17. The apparatus of claim 12, wherein the vector is a two-dimensional vector.

18. The apparatus of claim 12, wherein the sample comprises one of the following: a brain, an eye, a retina, a tumor, a heart, skin, a kidney, an oral cavity, a gastroenterology tract, a respiratory tract, a reproductive system, and a cochlea.

* * * * *